United States Patent
Tseng

(10) Patent No.: US 10,206,059 B1
(45) Date of Patent: Feb. 12, 2019

(54) POSITIONING SYSTEM AND POSITIONING METHOD

(71) Applicant: HTC Corporation, Taoyuan (TW)

(72) Inventor: Mong-Yu Tseng, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/912,580

(22) Filed: Mar. 6, 2018

(51) Int. Cl.
*H04W 4/02* (2018.01)

(52) U.S. Cl.
CPC .................................. *H04W 4/02* (2013.01)

(58) Field of Classification Search
CPC ....... H04W 4/008; H04W 4/023; H04W 4/02; H04W 4/08
See application file for complete search history.

(56) References Cited

U.S. PATENT DOCUMENTS

| 9,843,720 B1* | 12/2017 | Ebsen | H04W 4/029 |
| 2012/0246180 A1* | 9/2012 | Yoshida | H04N 9/8205 707/756 |

* cited by examiner

*Primary Examiner* — Diane D Mizrahi
(74) *Attorney, Agent, or Firm* — JCIPRNET

(57) ABSTRACT

A positioning system and a positioning method are provided. The positioning system includes a target apparatus, at least one non-optical positioning apparatus, a plurality of optical positioning apparatuses and a host. The non-optical positioning apparatus and the optical positioning apparatuses are disposed in a field. The host determines a rough position of the target apparatus in the field based on a non-optical positioning signal of the non-optical positioning apparatus. The host selects one or more selected optical positioning apparatuses located within a default range of the rough position from the optical positioning apparatuses. The host dynamically enables the selected optical positioning apparatus, and the host dynamically disables the remaining optical positioning apparatus out of the default range among the optical positioning apparatuses.

16 Claims, 10 Drawing Sheets

POSITIONING SYSTEM AND POSITIONING METHOD

BACKGROUND OF THE INVENTION

1. Field of the Invention

The invention relates to an electronic system, and particularly relates to a positioning system and a positioning method.

2. Description of Related Art

In the virtual reality display technologies, positioning techniques are commonly adopted to verify the position of the user (and a target apparatus) in a field, so as to offer a desirable human-machine interactive interface. In general, an optical positioning apparatus (e.g., a lighthouse) has a higher positioning accuracy within a smaller range (e.g., 5 to 7 meters) of positioning. However, the optical positioning signal provided by the optical positioning apparatus may be shielded by an obstacle (e.g., a wall). Therefore, tracking of a moving object by a single set of optical positioning apparatus may be confined by distance and topographical limitations. As a consequence, the positioning range and tracking is reduced.

Regarding a large-sized field, since the positioning range of the optical positioning apparatus is smaller, a large number of optical positioning apparatuses need to be arranged at different positions of the field. The large number of optical positioning apparatuses needs to be always enabled to constantly provide the optical positioning signals to the field without interruption. Accordingly, the target apparatus and the host are able to determine the user's position in the field based on the optical positioning signals, regardless of wherever the target apparatus (e.g., a head-mounted electronic apparatus) moves in the field. Hence, the large number of optical positioning apparatuses may consume a large amount of power in order to constantly provide the optical positioning signals to the field. If the optical positioning apparatuses are powered by batteries, constantly providing the optical positioning signals may facilitate the consumption of the power in the batteries.

SUMMARY OF THE INVENTION

One or some exemplary embodiments of the invention provide a positioning system and a positioning method capable of adaptively and dynamically enabling/disabling an optical positioning apparatus.

An embodiment of the invention provides a positioning system. The positioning system includes a target apparatus, at least one non-optical positioning apparatus, a plurality of optical positioning apparatuses, and a host. The non-optical positioning apparatus is disposed in a field and configured to provide a non-optical positioning signal. The optical positioning apparatuses are disposed in the field. Any of the optical positioning apparatuses optionally provides an optical positioning signal to the field. The host is coupled to the target apparatus. The host determines the rough position of the target apparatus in the field based on the non-optical positioning signal. The host selects one or more selected optical positioning apparatuses within a default range of the rough position from the optical positioning apparatuses. The host dynamically enables the selected optical positioning apparatuses. The host dynamically disables the remaining optical positioning apparatus out of the default range among the optical positioning apparatuses.

An embodiment of the invention provides a positioning method adapted for a positioning system. The positioning system includes a target apparatus, a host, at least one non-optical positioning apparatus, and a plurality of optical positioning apparatuses. The positioning method includes the following. The at least one non-optical positioning apparatus is disposed in a field, and the at least one non-optical positioning apparatus is configured to provide a non-optical positioning signal. The optical positioning apparatuses are disposed in the field, and any of the optical positioning apparatuses is configured to optionally provide an optical positioning signal to the field. A rough position of the target apparatus in the field is determined based on the non-optical positioning signal. One or more selected optical positioning apparatuses within a default range of the rough position are selected from the optical positioning apparatuses. The one or more selected optical positioning apparatuses are enabled dynamically. The remaining optical positioning apparatus out of the default range among the optical positioning apparatuses is disabled dynamically.

Based on the above, in some embodiments of the invention, the positioning system and the positioning method may adaptively enable and disable the optical positioning apparatuses based on the rough position of the target apparatus to reduce the power consumption of the positioning system.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
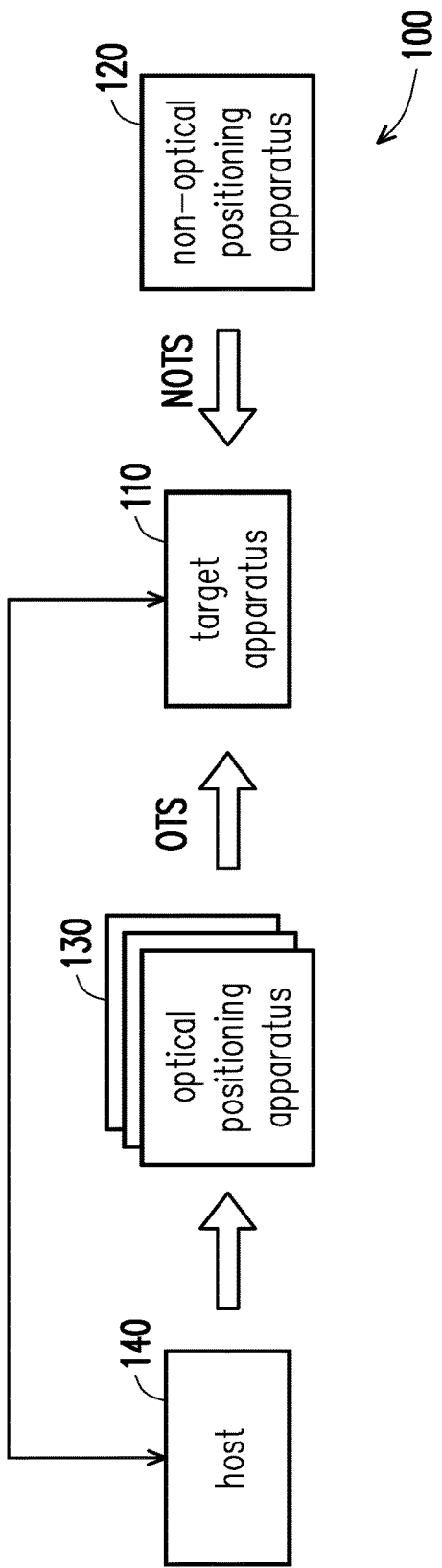
FIG. 1 is a schematic block diagram illustrating apparatuses of a positioning system according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Throughout the specification (including claims), the term "couple (or connect)" may refer to any direct or indirect connection means. For example, if it is described that a first apparatus is coupled (or connected) to a second apparatus, it shall be interpreted that the first apparatus may be directly connected to the second apparatus, and the first apparatus may be indirectly connected to the second apparatus via another apparatus or some connection means. Moreover, elements/components/steps with same reference numerals represent same or similar parts in the drawings and embodiments. Descriptions of elements/components/steps referred to by the same reference numerals or described with the same terms in different embodiments may be incorporated by reference.

FIG. 1 is a schematic block diagram illustrating apparatuses of a positioning system 100 according to an embodiment of the invention. Referring to FIG. 1, a positioning system 100 may include a target apparatus 110, at least one non-optical positioning apparatus 120, a plurality of optical positioning apparatuses 130, and a host 140. The target apparatus 110 is an object to be positioned or tracked. The target apparatus 110 is an electronic apparatus capable of computing, storing and communicating. Based on the design needs, the target apparatus 110 may be a laptop computer, a smartphone, a head-mounted display apparatus, a wearable electronic apparatus, or other electronic apparatuses. The embodiment does not intend to impose a limitation on the type and the structure of the target apparatus 110.

The non-optical positioning apparatus 120 is disposed in a field and configured to provide a non-optical positioning signal NOTS to the field. Therefore, the target apparatus 110 in the field may receive the non-optical positioning signal NOTS. In the embodiment, the field may be a space that is 10 meters in length and width or a space in a different size or a different geometric shape. The embodiment does not intend to impose a limitation on the type and the range of the field. Based on the design needs, the non-optical positioning apparatus 120 may be an electronic apparatus having a wireless communication module, and the non-optical positioning signal NOTS may be a wireless signal transmitted via wireless communication, such as a Wi-Fi signal, a Bluetooth signal, a $3^{rd}$ generation (3G) mobile communication signal, a worldwide interoperability for microwave access (WiMAX) signal or other positioning signals not based on an optical technology. For example, the non-optical positioning apparatus 120 may provide a conventional radio-frequency signal or other non-optical signals as the non-optical positioning signal NOTS to the field. The embodiment does not intend to limit the types of the non-optical positioning apparatus 120 and the non-optical positioning signal NOTS.

The optical positioning apparatuses 130 are disposed in the field. Any of the optical positioning apparatuses 130 may optionally provide an optical positioning signal OTS to the field. Since the optical positioning apparatus 130 may provide the optical positioning signal OTS to the field, the target apparatus 110 in the field may receive the optical positioning signal OTS. Based on the design needs, the optical positioning signal OTS may be a laser positioning signal, an infrared optical positioning signal, a visible light positioning signal, or other optical positioning signals. For example, the optical positioning signal 130 may provide a conventional optical positioning signal or other optical signals to the field as the optical positioning signal OTS. The embodiment does not intend to limit the types of the optical positioning apparatus 130 and the optical positioning signal OTS.

The host 140 is coupled to the target apparatus 110. The host 140 is an electronic apparatus capable of computing, storing, and communicating, such as a personal computer or a server. The embodiment does not intend to limit the type of the host 140. In the embodiment shown in FIG. 1, the host 140 and the target apparatus 110 may be electronic apparatuses independent from each other. Based on the design needs, the host 140 and the target apparatus 110 may be integrated in the same electronic apparatus in other embodiments.

In the embodiment shown in FIG. 1, the host 140 may be coupled to the target apparatus 110 via wireless communication, so as to bidirectionally transmit signals. Based on the design needs, the host 140 may also be coupled to the target apparatus 110 via wired communication or other communication means in other embodiments. In the embodiment, the host 140 may be coupled to the optical positioning apparatus 130 via wireless communication to exert control on whether any of the optical positioning apparatuses 130 provides the optical positioning signal OTS to the field. Based on the design needs, the host 140 may also be coupled to the optical positioning apparatuses 130 via wired communication or other communication means in other embodiments. Under the control of the host 140, any of the optical positioning apparatuses 130 may dynamically provide (or not provide) the optical positioning signal OTS to the field.

In the embodiment shown in FIG. 1, the target apparatus 110 in the field may receive the non-optical positioning signal NOTS, and then transmit relevant information corresponding to the non-optical positioning signal NOTS to the host 140. Therefore, the host 140 may obtain a rough position of the target apparatus 110 through calculation based on the non-optical positioning signal NOTS. For example, the non-optical positioning signal NOTS may include a radio-frequency signal, and the host 140 may decode the radio-frequency signal received by the target apparatus. Depending on a received signal strength indicator (RSSI) signal, a beacon signal, or other radio-frequency signals, the host 140 may obtain the rough position of the target apparatus 110 in the field through calculation based on a signal intensity of the radio-frequency signal. For example, the host 140 may carry out a conventional positioning algorithm or other positioning algorithms based on the non-optical positioning signal NOTS to obtain the rough position of the target apparatus 110 through calculation. As the target apparatus 110 may move as time passes, the host 140 may dynamically turn on the optical positioning apparatus 130 near the target apparatus 110 and turn off remaining of the optical positioning apparatuses 130 based on the rough position of the target apparatus 110, so as to reduce the power consumption of the optical positioning apparatuses 130.

Figure 2:
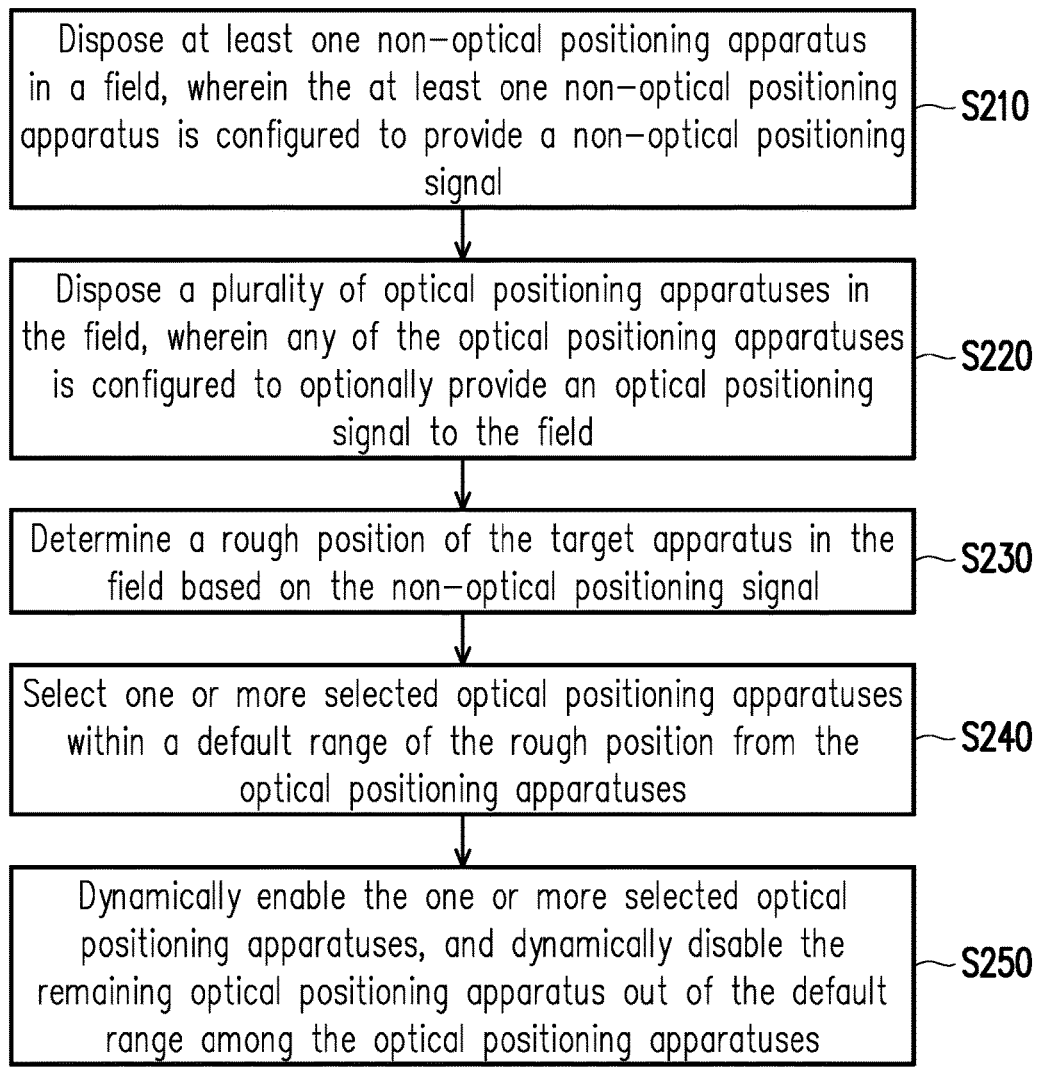
FIG. 2 is a schematic flowchart illustrating a positioning method according to an embodiment of the invention.

FIG. 2 is a schematic flowchart illustrating a positioning method according to an embodiment of the invention. Referring to FIGS. 1 and 2, at Step S210, at least one non-optical positioning apparatus 120 is disposed in the field to provide the non-optical positioning signal NOTS. At Step S220, the optical positioning apparatuses 130 are disposed in the field. Any of the optical positioning apparatuses 130 may optionally provide an optical positioning signal OTS to the field.

Then, at Step S230, the host 140 may determine the rough position of the target apparatus 110 in the field based on the non-optical positioning signal NOTS. In the embodiment shown in FIG. 1, the target apparatus 110 in the field may receive the non-optical positioning signal NOTS transmitted by the non-optical positioning apparatus 120 and transmit relevant information corresponding to the non-optical positioning signal NOTS to the host 140. For example, the non-optical positioning signal NOTS may be a Wi-Fi signal, and the target apparatus 110 transmits signal intensity information of the received Wi-Fi signal to the host 140. Based on the signal intensity information of Wi-Fi signals from two non-optical positioning apparatuses 120 at different positions, the host 140 may obtain the rough position of the target apparatus 110 in the field through calculation based on the conventional triangulation method (or other algorithms). In general, the positioning range of Wi-Fi positioning is greater than the positioning range of optical positioning. However, Wi-Fi positioning is less precise than optical positioning.

At Step S240, the host 140 may select one or more selected optical positioning apparatuses within a default range of the rough position from the optical positioning apparatuses 130. The default range may be determined based on the design needs. For example, the default range may be a positioning range of the optical positioning apparatus 130. For example, if the positioning range of the optical positioning apparatus 130 is 7 meters, the default range may be set as "a circle centered at the rough position determined in Step S230 and having a radius of 7 meters". The host 140 may select the optical positioning apparatus 130 covered in the default range as the "selected optical positioning apparatus". Since the target apparatus 110 may move, the rough positions calculated at different time points and the optical positioning apparatuses 130 covered in the default range of the rough positions may differ accordingly. Therefore, the "selected optical positioning apparatus" selected by the host 140 may also be dynamically changed through time.

Then at Step S250, the host 140 may dynamically enable the selected optical positioning apparatus, and the selected optical positioning apparatus may provide the optical positioning signal OTS to the field accordingly. Therefore, the host 140 may dynamically enable one or more corresponding selected optical positioning apparatuses based on the change of the rough position of the target apparatus 110. Consequently, the optical positioning apparatus 130 near the target apparatus 110 is generally an enabled optical positioning apparatus. Since the optical positioning apparatus 130 near the target apparatus 110 may provide the optical positioning signal OTS to the target apparatus 110, the target apparatus 110 and the host 140 may carry out high-accuracy positioning by using the optical positioning signal OTS.

Besides, at Step S250, the host 140 may dynamically disable the remaining optical positioning apparatus out of the default range among the optical positioning apparatuses 130. In other words, the "remaining optical positioning apparatuses" are refrained from providing/generating the optical positioning signals OTS. As the rough position of the target apparatus 110 changes, the target apparatus 110 may move away from the range of optical positioning of "a certain optical positioning apparatus". Under the circumstance, the host 140 may dynamically disable (e.g., turn off) "the certain optical positioning apparatus" to reduce power consumption. Therefore, the host 140 may dynamically turn off some optical positioning apparatuses 130 distant to the target apparatus 110. The enabling and disabling may be carried out synchronously or non-synchronously. The embodiment does not intend to limit an order between enabling and disabling.

Figure 3:
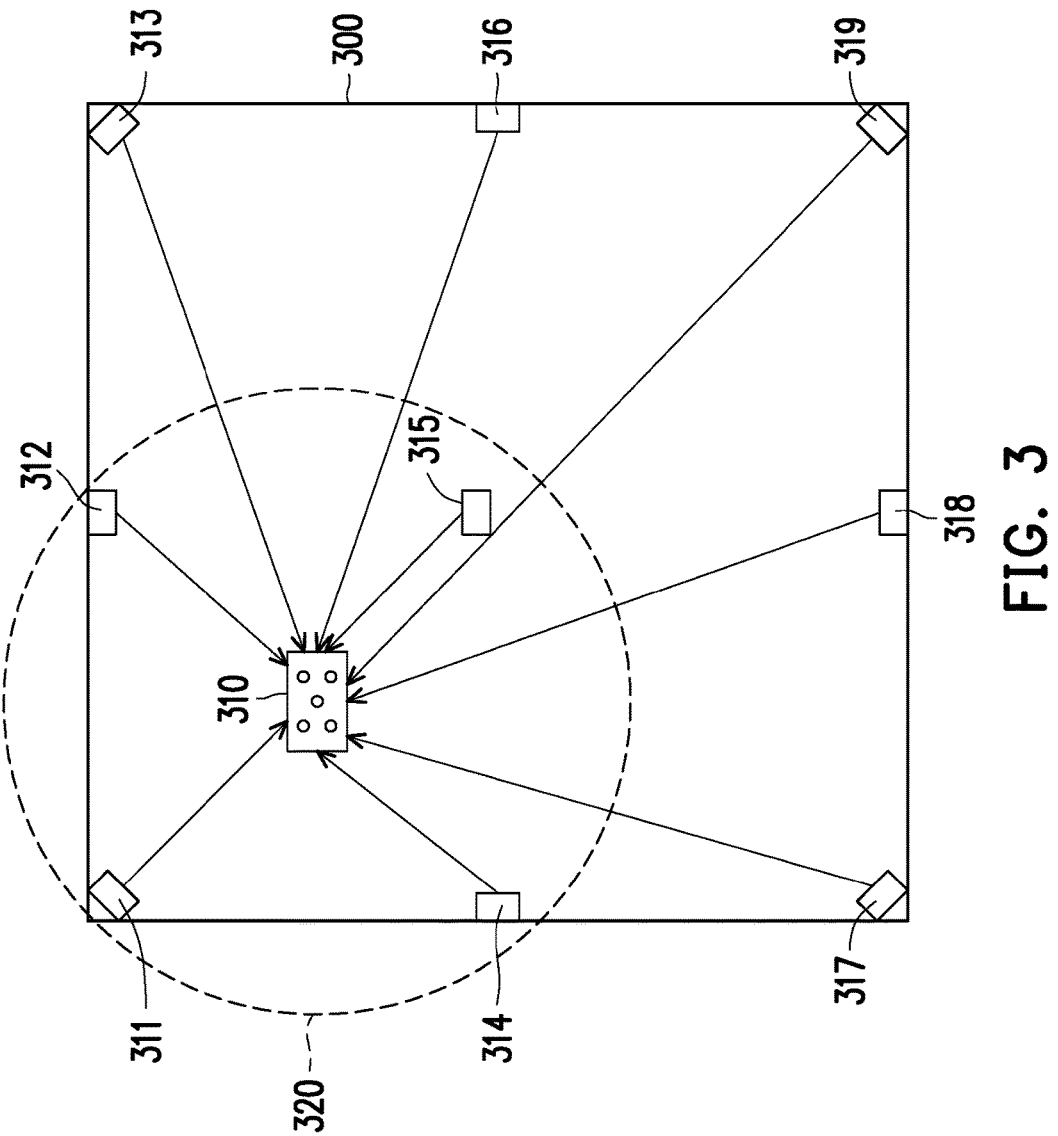
FIG. 3 is a view illustrating an operating scenario of a positioning system according to an embodiment of the invention.

FIG. 3 is a view illustrating an operating scenario of a positioning system according to an embodiment of the invention. The positioning system shown in FIG. 3 includes a target apparatus 310, nine non-optical positioning apparatuses and nine optical positioning apparatuses. Any of base stations 311 to 319 shown in FIG. 3 may include a non-optical positioning apparatus and an optical positioning apparatus. Details of the target apparatus 310 shown in FIG. 3 may be referred to the descriptions about the target apparatus 110 in the embodiments shown in FIGS. 1 and 2. Referring to FIG. 3, in the embodiment, a field 300 is a room that is 20 meters in length and width, for example, and the base stations 311 to 319 are disposed in the field 300. The size of the room, the number of the base stations, and the positions and distribution of the base stations are only described herein for an illustrative purpose and shall not be construed as limitations of the embodiment. In the embodiment, the base stations 311 to 319 are respectively electronic apparatuses having the non-optical positioning apparatuses 120 and the optical positioning apparatuses 130 shown in FIG. 1. The non-optical positioning apparatuses 120 in the base stations 311 to 319 may provide the non-optical positioning signals NOTS (e.g., Wi-Fi signals) to the field 300, as shown in FIG. 3.

The Wi-Fi signal of each of the base stations has a specific identifier (ID). When the target apparatus 310 (e.g., a head-mounted display) is located in the field 300, the target apparatus 310 may receive the Wi-Fi signals provided by the base stations 311 to 319, and the respective Wi-Fi signals are measured for their signal intensities. The target apparatus 310 may transmit the signal intensities of the Wi-Fi signals of the base stations 311 to 319 to the host 140. Details in this regard may be referred to relevant descriptions in the embodiments of FIGS. 1 and 2. The host 140 may carry out an appropriate decoding process to decode and identify the base stations corresponding to the respective Wi-Fi signals. The embodiment does not intend to limit on how the decoding is carried out. Then, the host 140 may obtain the rough position of the target apparatus 310 in the field 300 through calculation by applying a positioning calculation process (e.g., the triangulation method) to the signal intensities of the Wi-Fi signals of the base stations 311 to 319. For example, the host 140 may select at least three valid Wi-Fi signals whose signal intensities are greater than a default threshold among the Wi-Fi signals, such as the Wi-Fi signals from the base stations 311, 312, 314, and 315. Based on the selected Wi-Fi signals, the host 140 may obtain the rough position of the target apparatus 310 in the field 300 through calculation based on the triangulation method, as shown in FIG. 3. Based on the rough position of the target apparatus 310, the host 140 may determine a default range 320.

Then, based on the default range 320, the host 140 may select the optical positioning apparatuses of the base stations 311, 312, 314, and 135 closer to the target apparatus 310 as the "selected optical positioning apparatuses". The host 140 may enable the selected optical positioning apparatuses to provide the optical positioning signals OTS to the target apparatus 310. Besides, the host 140 may dynamically disable the remaining optical apparatus (e.g., the optical positioning apparatuses of the base stations 311 and 316 to 319 shown in FIG. 3) out of the default range 320 among the optical positioning apparatuses of the base stations 311 to 319. Different optical positioning signals OTS of different base stations have different specific IDs. The target apparatus 310 may sense the optical positioning signals OTS of the base stations (e.g., the base stations 311, 312, 314, and 315) and return the relevant information of the optical positioning signals OTS to the host 140. Details in this regard may be referred to relevant descriptions in the embodiments of FIGS. 1 to 2. Therefore, the host 140 may determine the precise position of the target apparatus 310 in the field 300 based on the optical positioning signals OTS.

In the embodiment, the selected optical positioning apparatuses may simultaneously transmit the optical positioning signals OTS to the field 300. For example, the selected optical positioning apparatuses (e.g., the selected optical positioning apparatuses of the base stations 311, 312, 314, and 315) may simultaneously transmit the optical positioning signals (e.g., infrared signals) to the target apparatus 310 to facilitate the positioning accuracy.

Figure 4:
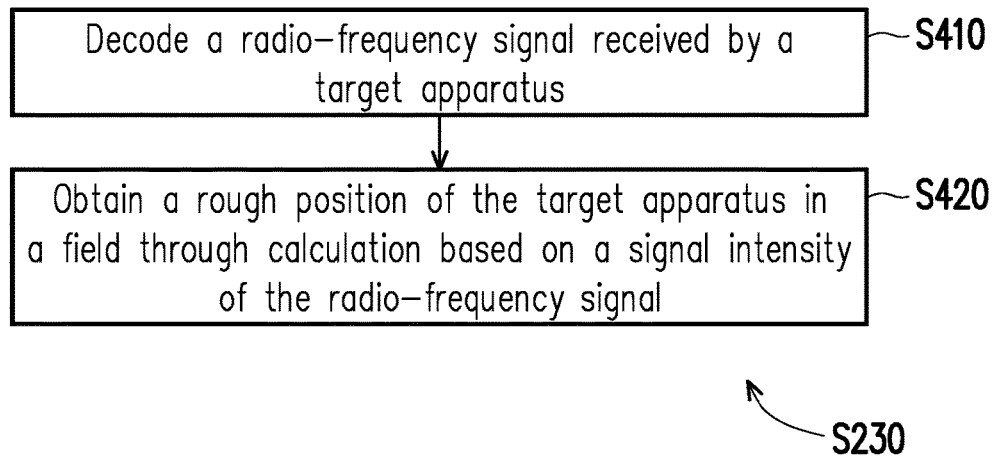
FIG. 4 is a schematic flowchart illustrating determining a rough position of a target apparatus according to an embodiment of the invention.

FIG. 4 is a flowchart illustrating determining a rough position of a target apparatus according to an embodiment of the invention. Relevant descriptions of FIG. 4 may server as reference for Step S230 of FIG. 2. Referring to FIGS. 1 and 4, at Step S410, the host 140 may decode the radio-frequency signal (the non-optical positioning signal NOTS) received by the target apparatus 110. The radio-frequency signal is a Wi-Fi signal having a specific ID. The host 140 may carry out an appropriate decoding process to identify the base station corresponding to each Wi-Fi signal. At Step S420, the host 410 may determine the rough position of the target apparatus 110 in the field through calculation based on the signal intensity of the radio-frequency signal.

The host 140 may dynamically enable the optical positioning apparatus 130 within the default range (i.e., near the target apparatus 110), and dynamically disable the optical positioning apparatus 130 out of the default range. The enabled optical positioning apparatus 130 (i.e., the selected optical positioning apparatus) may provide the optical positioning signal OTS to the target apparatus 110. The host 140 may determine the precise position of the target apparatus 110 in the field based on the optical positioning signal OTS received by the target apparatus 110.

Figure 5:
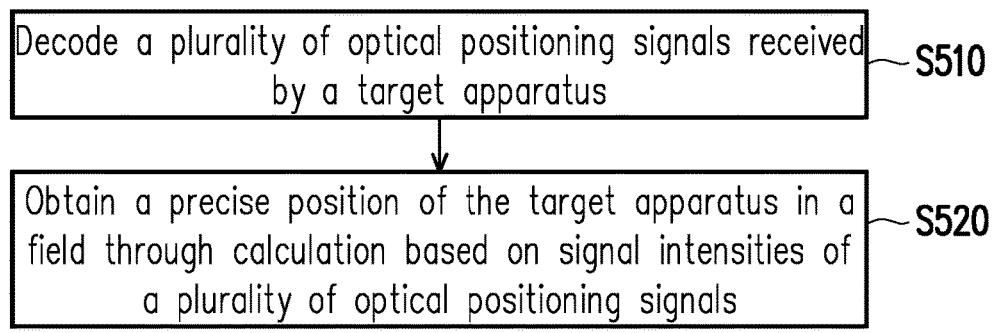
FIG. 5 is a schematic flowchart illustrating determining a precise position of a target apparatus according to an embodiment of the invention.

FIG. 5 is a flowchart illustrating determining a precise position of a target apparatus according to an embodiment of the invention. At Step S510, the host 140 may decode the optical positioning signal OTS received by the target apparatus 100. The host 140 may carry out an appropriate decoding process to identify the base station corresponding to each optical positioning signal OTS. The embodiment does not intend to limit on how the decoding is carried out. At Step S520, the host 110 may obtain the precise position of the target apparatus 110 in the field through calculation based on the signal intensity of the optical positioning signal OTS.

Figure 6A:
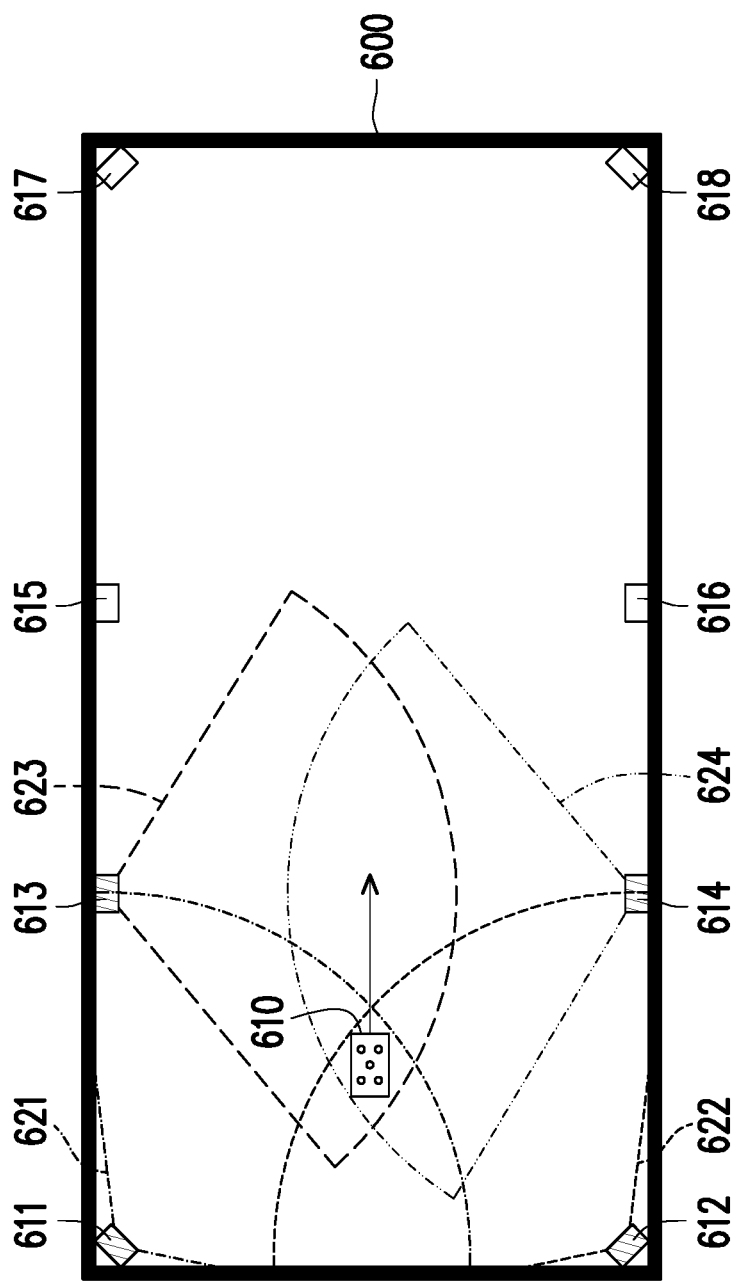
FIGS. 6A, 6B, and 6C are views illustrating operating scenarios of dynamically enabling and disabling a positioning system according to another embodiment of the invention.
Figure 6B:
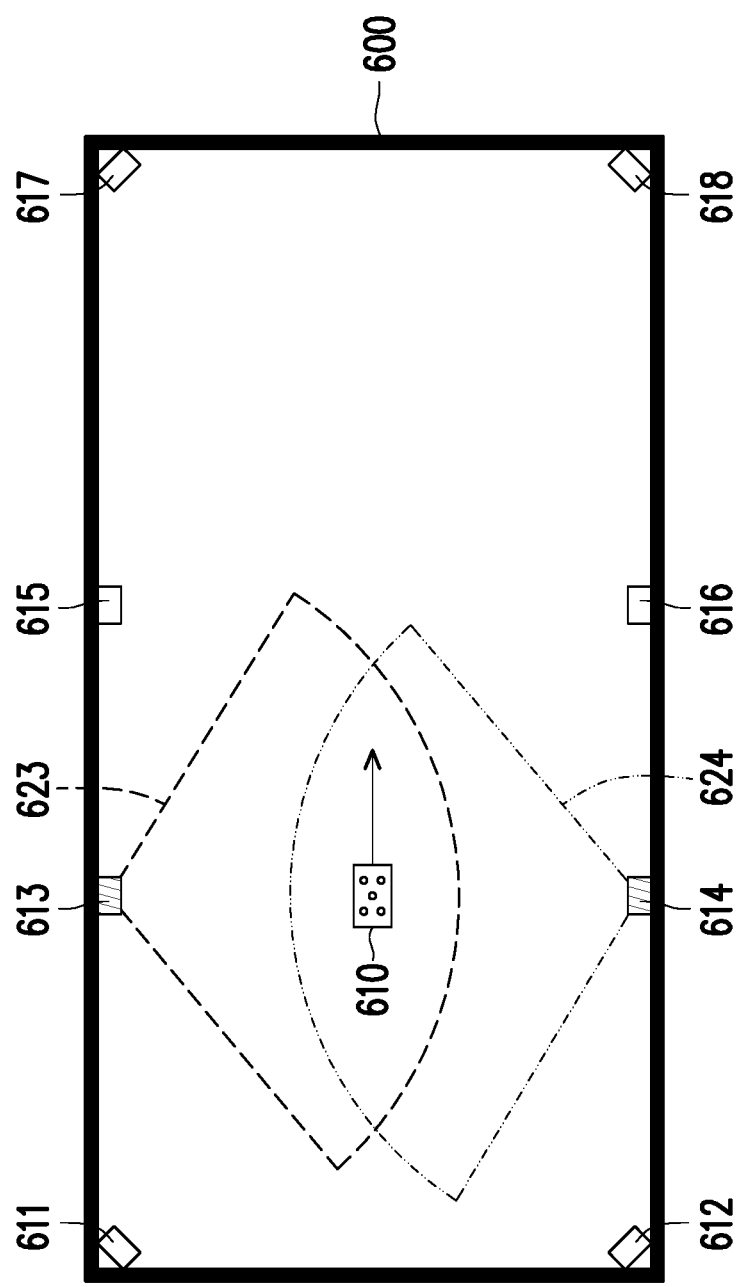
Figure 6C:
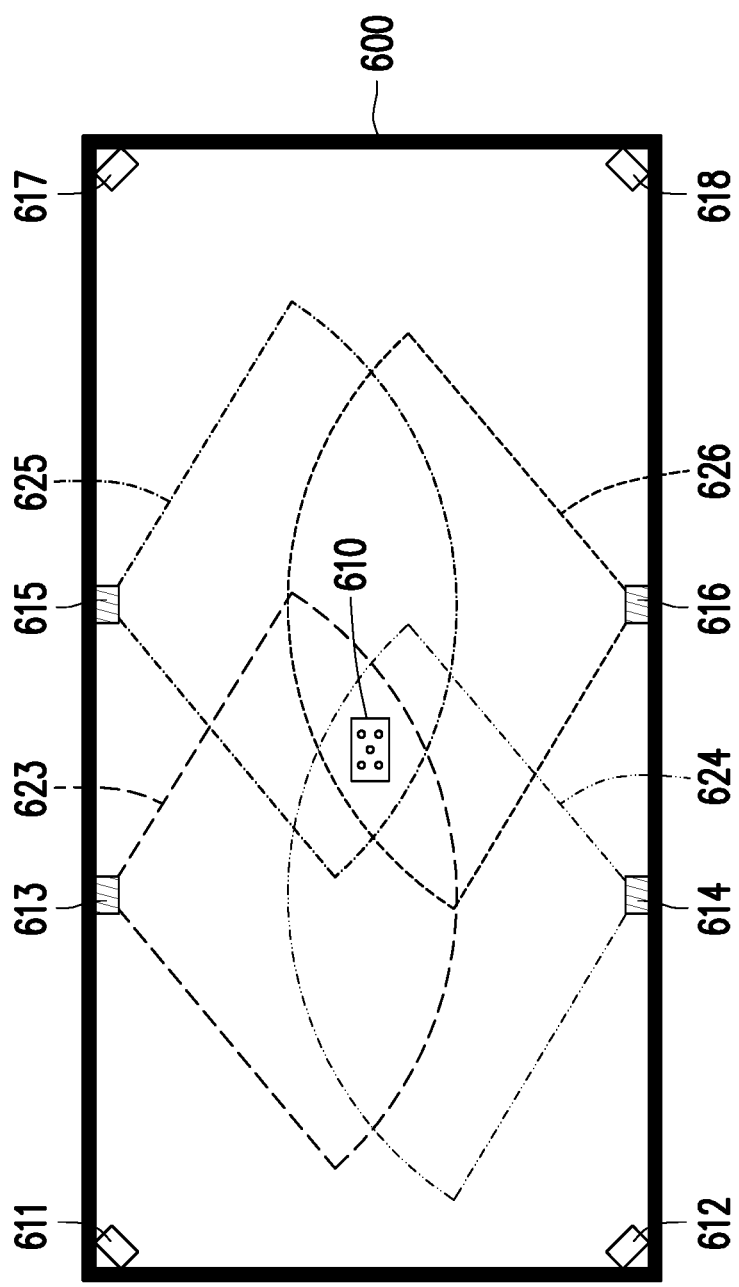

FIGS. 6A, 6B, and 6C are schematic views illustrating operating scenarios of dynamically enabling and disabling a positioning system according to another embodiment of the invention. The positioning system shown in FIGS. 6A, 6B, and 6C includes a target apparatus 610, eight non-optical positioning apparatuses and eight optical positioning apparatuses. Any of base stations 611 to 618 shown in FIGS. 6A, 6B, and 6C may include a non-optical positioning apparatus and an optical positioning apparatus. Details of the target apparatus 610 shown in FIGS. 6A, 6B, and 6C may be referred to the descriptions about the target apparatus 110 in the embodiments shown in FIGS. 1 and 2. Referring to FIG. 6A, in the embodiment, a field 600 is a room that is 30 meters in length and 10 meters in width, for example, and the base stations 611 to 618 are disposed in a field 600. The size of the room, the number of the base stations, and the positions and distribution of the base stations are only described herein for an illustrative purpose and shall not be construed as limitations of the embodiment. In the embodiment, the base stations 611 to 618 are respectively electronic apparatuses having the non-optical positioning apparatuses 120 and the optical positioning apparatuses 130 shown in FIG. 1. The non-optical positioning apparatuses 120 in the base stations 611 to 618 may provide the non-optical positioning signals NOTS to the field 600. Under the control of the host 140, the optical positioning apparatuses 130 in the base stations 611 to 618 may optionally provide the optical positioning signals OTS to the field 600. The positioning range (about 5 to 7 meters) of the optical positioning signal OTS is smaller than the positioning range (about 20 to 30 meters) of the non-optical positioning signal NOTS. In the embodiment, the positioning range of the optical positioning signal OTS is fan-shaped. For example, the positioning range of the optical positioning signal OTS generated by the base station 611 is a fan-shaped range 621 shown in FIG. 6A.

In the scenario shown in FIG. 6A, the target apparatus 610 moves toward the right of FIG. 6A. Based on the non-optical positioning signals NOTS transmitted by the base stations 611 to 618, the host 140 obtains the rough position of the target apparatus 610 in the field 600. Therefore, the host 140 may turn on/enable the optical positioning apparatuses 130 (e.g., the optical positioning apparatuses 130 of the base stations 611 to 614 shown in FIG. 6A) within the default range of the rough position of the target apparatus 610, and turn off/disable the optical positioning apparatuses 130 (e.g., the optical positioning apparatuses 130 of the base stations 615 to 618 shown in FIG. 6A) out of the default range. Since the target apparatus 610 is located within positioning ranges 621, 622, 623, and 624 of the base stations 611, 612, 613, and 614, the target apparatus 610 may receive the optical positioning signals OTS respectively transmitted by the base stations 611, 612, 613, and 614.

In the scenario shown in FIG. 6B, the target apparatus 610 continues to move toward the right of FIG. 6B. Based on the non-optical positioning signals NOTS transmitted by the base stations 611 to 618, the host 140 obtains the current rough position of the target apparatus 610 in the field 600. Therefore, the host 140 may turn on/enable the optical positioning apparatus 130 (e.g., the optical positioning apparatuses 130 of the base stations 613 to 614 shown in FIG. 6B) within the default range of the rough position of the target apparatus 610, and turn off/disable the optical positioning apparatus 130 (e.g., the optical positioning apparatuses 130 of the base stations 611 to 612 and 615 to 618 shown in FIG. 6B) out of the default range. Since the target apparatus 610 is located within the positioning ranges 623 and 624 of the base stations 613 and 614, the target apparatus 610 may receive the optical positioning signals OTS respectively transmitted by the base stations 613 and 614.

In the scenario shown in FIG. 6C, the host 140 obtains the current rough position of the target apparatus 610 in the field 600 based on the non-optical positioning signals NOTS transmitted by the base stations 611 to 618. Therefore, the host 140 may turn on/enable the optical positioning apparatuses 130 (e.g., the optical positioning apparatuses 130 of the base stations 613 to 616 shown in FIG. 6C) within the default range of the rough position of the target apparatus 610, and turn off/disable the optical positioning apparatuses 130 (e.g., the optical positioning apparatuses 130 of the base stations 611, 612, 617, and 618 shown in FIG. 6C) out of the default range. Since the target apparatus 610 is located within positioning ranges 623, 624, 625, and 626 of the base stations 613, 614, 615, and 616, the target apparatus 610 may receive the optical positioning signals OTS respectively transmitted by the base stations 613, 614, 615, and 616.

Figure 7:
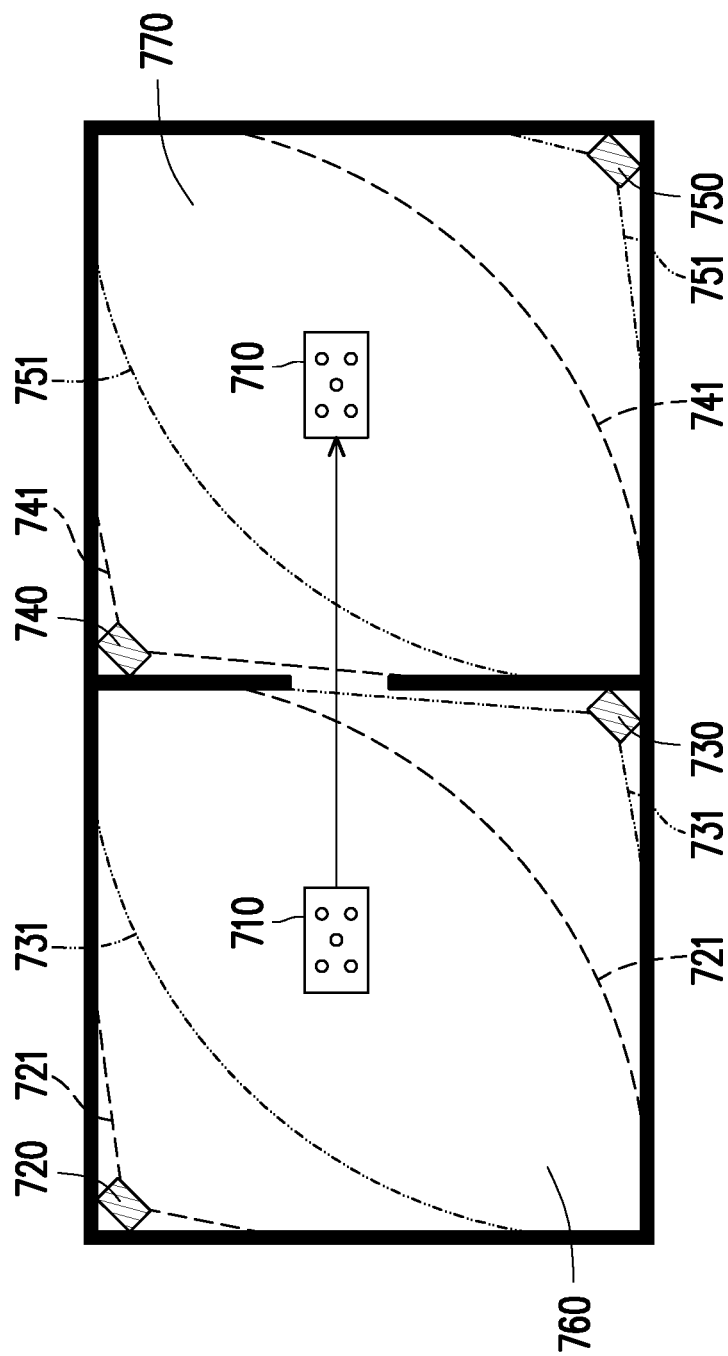
FIG. 7 is a view illustrating an operating scenario of a positioning system in a landform with an obstacle according to an embodiment of the invention.

FIG. 7 is a schematic view illustrating an operating scenario of a positioning system in a landform with an obstacle according to an embodiment of the invention. The positioning system shown in FIG. 7 includes a target apparatus 710, four non-optical positioning apparatuses and four optical positioning apparatuses. Any of base stations 720, 730, 740, and 750 shown in FIG. 7 may include a non-optical positioning apparatus and an optical positioning apparatus. Details of the target apparatus 710 shown in FIG. 7 may be referred to the descriptions about the target apparatus 110 in the embodiments shown in FIGS. 1 and 2. Referring to FIG. 7, a field 760 and a field 770 are respectively rooms that are 5 meters in length and width. There are walls and a channel between the fields 760 and 770, and a plurality of base stations are disposed in the fields. Any of base stations 720, 730, 740, and 750 may include the non-optical positioning apparatus 120 and the optical positioning apparatus 130 shown in FIG. 1. The base stations 720 and 730 are in the field 760, and the base stations 740 and 750 are in the field 770. The non-optical positioning apparatuses 120 in the base stations 720, 730, 740, and 750 may provide the non-optical positioning signals NOTS to the fields 760 and 770. Based on the non-optical positioning signals NOTS transmitted by the base stations 720, 730, 740, and 750, the host 140 obtains the rough positions of the target apparatus 710 in the fields 760 and 770. Under the control of the host 140, the optical positioning apparatuses 130 in the base stations 720, 730, 740, and 750 may optionally provide optical positioning signals 721, 731, 741, and 751 to optically position the target apparatus 710. The positioning ranges of the optical positioning signals 721, 731, 741, and 751 are 5 to 7 meters, for example, and are fan-shaped. In addition, the optical positioning signals 721, 731, 741, and 751 may be shielded and blocked by obstacles such as walls.

In the scenario shown in FIG. 7, the target apparatus 710 moves toward the right of FIG. 7 from the field 760 to the field 770. When the target apparatus 710 is located in the field 760, the host 140 obtains the rough position of the target apparatus 710 in the field 760 based on the non-optical positioning signals NOTS transmitted by the base stations 720, 730, 740, and 750. The host 140 may turn on/enable the optical positioning apparatuses 130 (e.g., the optical positioning apparatuses 130 of the base stations 720 and 730 shown in FIG. 7) within the default range of the rough position of the target apparatus 710, and turn off/disable the optical positioning apparatuses 130 (e.g., the optical positioning apparatuses 130 of the base stations 740 and 750 shown in FIG. 7) out of the default range. Therefore, the optical positioning apparatuses 130 in the base stations 720 and 730 may respectively provide the optical positioning signals 721 and 731 to optically position the target apparatus 710.

Then, the target apparatus 710 moves from the field 760 to the field 770. When the target apparatus 710 is located in the field 770, the host 140 obtains the rough position of the target apparatus 710 in the field 770 based on the non-optical positioning signals NOTS transmitted by the base stations 720, 730, 740, and 750. The host 140 may turn on/enable the optical positioning apparatuses 130 (e.g., the optical positioning apparatuses 130 of the base stations 740 and 750 shown in FIG. 7) within the default range of the rough position of the target apparatus 710, and turn off/disable the optical positioning apparatuses 130 (e.g., the optical positioning apparatuses 130 of the base stations 720 and 730 shown in FIG. 7) out of the default range. Therefore, the optical positioning apparatuses 130 in the base stations 740 and 750 may respectively provide the optical positioning signals 341 and 351 to optically position the target apparatus 710.

Since the optical positioning signals 721, 731, 741, and 751 are blocked by the walls, there may be a certain period of time during which the target apparatus 710 is passing through the channel and is thus out of the positioning ranges of the optical positioning signals 731 and 741 (i.e., unable to be optically positioned). Under the circumstance, the target apparatus 710 is unable to be constantly tracked. Therefore, the non-optical positioning apparatus 120 in the base station 720, the base station 730, the base station 740, and/or the base station 750 may provide the non-optical positioning signal NOTS. The non-optical positioning signal NOTS may be a Wi-Fi signal, for example, whose positioning range is 20 to 30 meters, for example. Since the Wi-Fi signal has a greater effective range and exhibits refractive, reflective, diffractive, and diffusive properties, the Wi-Fi signal is less prone to influences of obstacles. When the target apparatus 710 is passing through the channel between the field 760 and the field 770 and is out of the ranges of the optical positioning signals, the host (e.g., the host 140 shown in FIG. 1) and the target apparatus 710 may keep tracking the position of the target apparatus 710 without interruption by using the Wi-Fi signal.

Figure 8:
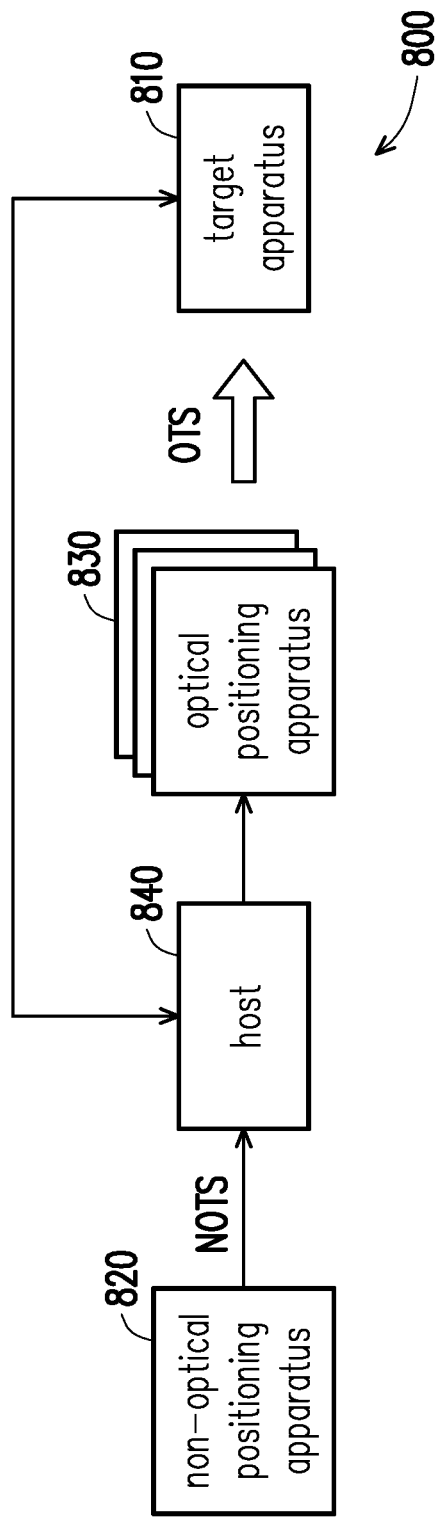
FIG. 8 is a schematic block diagram illustrating apparatuses of a positioning system according to another embodiment of the invention.

FIG. 8 is a schematic block diagram illustrating apparatuses of a positioning system 800 according to another embodiment of the invention. Referring to FIG. 8, a positioning system 800 may include a target apparatus 810, at least one non-optical positioning apparatus 820, a plurality of optical positioning apparatuses 830, and a host 840. The target apparatus 810, the optical positioning apparatuses 830, and the host 840 shown in FIG. 8 may be inferred based on the descriptions relating to the target apparatus 110, the optical positioning apparatuses 130 and the host 140 in the embodiments shown in FIGS. 1 and 2. Therefore, details in this regard will not be repeated in the following. In the embodiment shown in FIG. 8, the non-optical positioning apparatus 820 may include a pressure sensitive mat (not shown). The pressure sensitive mat is coupled to the host 840 via wireless communication. The pressure sensitive mat (the non-optical positioning apparatus 820) is disposed in the field to sense the rough position of the target apparatus 810 in the field and thereby generate the non-optical positioning signal NOTS to the host 840. The host 840 determines the rough position of the target apparatus 810 in the field based on the non-optical positioning signal NOTS.

Specifically, when the target apparatus 810 and/or the user moves in the field, the target apparatus 810 and/or the user may apply a pressure on the pressure sensitive map. The pressure sensitive map (the non-optical positioning apparatus 820) may convert an effective pressure that is sensed into the non-optical positioning signal NOTS (such as an electrical signal), and provide the non-optical positioning signal NOTS to the host 840 via wireless communication. The host 840 determines the rough position of the target apparatus 810 in the field based on the non-optical positioning signal NOTS (similar to Step S230 in FIG. 2). Details concerning how the host 840 determines the precise position of the target apparatus 810 in the field based on the optical positioning signals OTS transmitted by the optical positioning apparatuses 820 may be referred to relevant descriptions about Steps S240 and S250 shown in FIG. 2 and Steps S510 and S520 shown in FIG. 5, and thus will not be repeated in the following.

Figure 9:
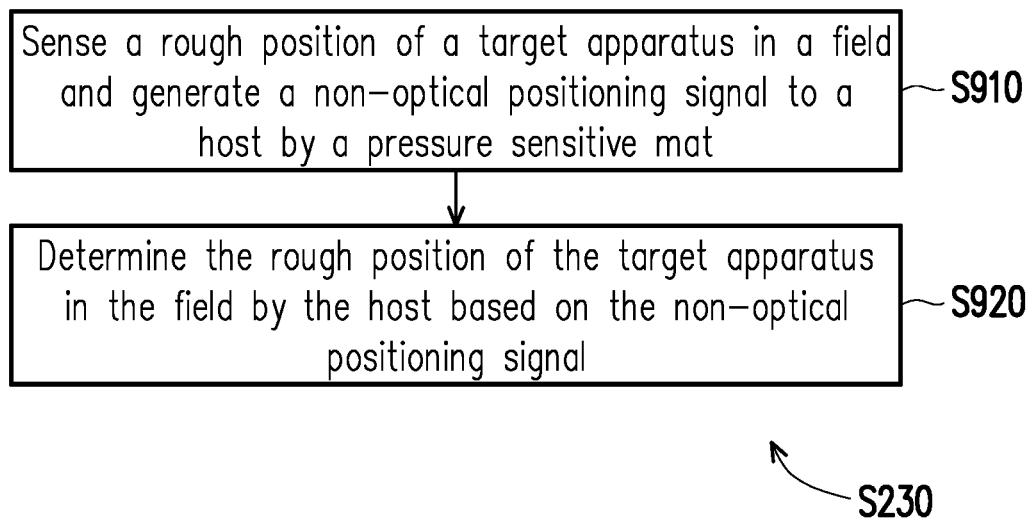
FIG. 9 is a schematic flowchart illustrating determining a rough position of a target apparatus according to another embodiment of the invention.

FIG. 9 is a flowchart illustrating determining a rough position of a target apparatus according to another embodiment of the invention. Relevant descriptions of FIG. 9 may server as reference for Step S230 of FIG. 2. Referring to FIGS. 1 and 9, at Step S910, the pressure sensitive mat (the non-optical positioning apparatus 820) may sense the rough position of the target apparatus 810 in the field and generate the non-optical positioning signal NOTS to the host 840. Then, at Step S920, the host 840 may determine the rough position of the target apparatus 810 in the field based on the non-optical positioning signal NOTS of the pressure sensitive mat (the non-optical positioning apparatus 820).

In view of the foregoing, in the positioning system and the positioning method according to the embodiments, the rough position of the target apparatus in the field is obtained to thereby increase the positioning range by disposing the non-optical positioning apparatus and the optical positioning apparatuses in the field. By dynamically enabling and disabling the optical positioning apparatuses, the power consumption of the positioning system is reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A positioning system, comprising:
   a target apparatus;
   at least one non-optical positioning apparatus, disposed in a field and configured to provide a non-optical positioning signal;
   a plurality of optical positioning apparatuses, disposed in the field, wherein any of the optical positioning apparatuses is configured to optionally provide an optical positioning signal to the field, wherein the optical positioning signal is more precise than the non-optical positioning signal, wherein a positioning range of an optical positioning apparatus is smaller than a positioning range of a non-optical positioning apparatus; and
   a host, coupled to the target apparatus, wherein the host determines a position of the target apparatus in the field based on the non-optical positioning signal, the host selects one or more selected optical positioning apparatuses within a default range of the position from the optical positioning apparatuses, the host dynamically enables the one or more selected optical positioning apparatuses, and the host dynamically disables the remaining optical positioning apparatus out of the default range among the optical positioning apparatuses to reduce power consumption of the positioning system.

2. The positioning system as claimed in claim 1, wherein the host is coupled to the target apparatus via wireless transmission to bidirectionally transmit signals.

3. The positioning system as claimed in claim 1, wherein the host is coupled to the optical positioning apparatuses via wireless transmission to control whether any of the optical positioning apparatuses provides the optical positioning signal to the field.

4. The positioning system as claimed in claim 1, wherein the one or more selected optical positioning apparatuses simultaneously transmit the optical positioning signals to the field.

5. The positioning system as claimed in claim 1, wherein the non-optical positioning signal comprises a radio-frequency signal, and the host decodes the radio-frequency signal received by the target apparatus and obtains the position of the target apparatus in the field through calculation based on a signal intensity of the radio-frequency signal.

6. The positioning system as claimed in claim 1, wherein the at least one non-optical positioning apparatus comprises a pressure sensitive mat sensing the position of the target apparatus in the field to generate the non-optical positioning signal to the host, and the host determines the position of the target apparatus in the field based on the non-optical positioning signal.

7. The positioning system as claimed in claim 1, wherein the host determines a precise position of the target apparatus in the field based on the optical positioning signals transmitted by the one or more selected optical positioning apparatuses and received by the target apparatus.

8. The positioning system as claimed in claim 7, wherein the host decodes the optical positioning signals received by the target apparatus, and obtains the precise position of the target apparatus in the field through calculation based on signal intensities of the optical positioning signals.

9. A positioning method, adapted for a positioning system comprising a target apparatus, a host, at least one non-optical positioning apparatus and a plurality of optical positioning apparatuses, the positioning method comprising:
   disposing the at least one non-optical positioning apparatus in a field, wherein the at least one non-optical positioning apparatus is configured to provide a non-optical positioning signal;
   disposing the optical positioning apparatuses in the field, wherein any of the optical positioning apparatuses is configured to optionally provide an optical positioning signal to the field, wherein the optical positioning signal is more precise than the non-optical positioning signal, wherein a positioning range of an optical positioning apparatus is smaller than a positioning range of a non-optical positioning apparatus;
   determining a position of the target apparatus in the field based on the non-optical positioning signal;
   selecting one or more selected optical positioning apparatuses within a default range of the position from the optical positioning apparatuses;
   dynamically enabling the one or more selected optical positioning apparatuses; and
   dynamically disabling the remaining optical positioning apparatus out of the default range among the optical positioning apparatuses to reduce power consumption of the positioning system.

10. The positioning method as claimed in claim 9, wherein the host is coupled to the target apparatus via wireless transmission to bidirectionally transmit signals.

11. The positioning method as claimed in claim 9, wherein the host is coupled to the optical positioning apparatuses via wireless transmission to control whether the optical positioning apparatuses provide the optical positioning signal to the field.

12. The positioning method as claimed in claim 9, wherein the one or more selected optical positioning apparatuses simultaneously transmit the optical positioning signals to the field.

13. The positioning method as claimed in claim 9, wherein the non-optical positioning signal comprises a radio-frequency signal, and the step of determining the position of the target apparatus in the field comprises:

decoding the radio-frequency signal received by the target apparatus; and obtaining the position of the target apparatus in the field through calculation based on a signal intensity of the radio-frequency signal.

14. The positioning method as claimed in claim 9, wherein the at least one non-optical positioning apparatus comprises a pressure sensitive mat, and the step of determining the position of the target apparatus in the field comprises:

sensing the position of the target apparatus in the field and generating the non-optical positioning signal to the host by the pressure sensitive mat; and determining the position of the target apparatus in the field by the host based on the non-optical positioning signal.

15. The positioning method as claimed in claim 9, further comprising:

determining a precise position of the target apparatus in the field based on the optical positioning signals transmitted by the one or more selected optical positioning apparatuses and received by the target apparatus.

16. The positioning method as claimed in claim 15, wherein the step of determining the precise position of the target apparatus in the field comprises:

decoding the optical positioning signals received by the target apparatus; and obtaining the precise position of the target apparatus in the field through calculation based on signal intensities of the optical positioning signals.

\* \* \* \* \*